July 10, 1934.  F. R. CHESTER  1,966,089

ICE CREAM SCOOP AND THE LIKE

Filed March 6, 1933

INVENTOR
FRANK REGINALD CHESTER

BY

*Fetherstonhaugh & Co*
ATTORNEYS

Patented July 10, 1934

1,966,089

UNITED STATES PATENT OFFICE 1,966,089

ICE CREAM SCOOP AND THE LIKE

Frank Reginald Chester, Vancouver, British Columbia, Canada, assignor to Chester Bros. Ltd., Vancouver, British Columbia, Canada Application March 6, 1933, Serial No. 659,726

7 Claims. (Cl. 107—48)

My invention relates to improvements in ice cream scoops and the like. The objects of the invention are to provide means whereby the ice cream on being filled into the scoop retains its original consistency and is not compressed, whereby the filling of the scoop is effected with less muscular strain than with the regular type of scoop, and to provide means whereby the ice cream is retained in the scoop during its severance from the scoop surfaces and until the scoop is properly inverted over the vessel into which the ice cream is to be placed for serving to the customer.

The invention consists of providing a scoop having a receptacle with an opening through which ice cream is adapted to extrude when filling, a knife for passing the opening and a blade and operating mechanism therefor to project said blade over the top of the receptacle to act as a retainer against the dislodgment of ice cream, as will be more fully described in the following specification and shown in the accompanying drawing, in which:—

In the drawing like characters of reference indicate corresponding parts in each figure.

The numeral 1 indicates a scoop having a shank 2 provided with a handle 3 at one end and a receptacle 4 at the other.

Figure 1:
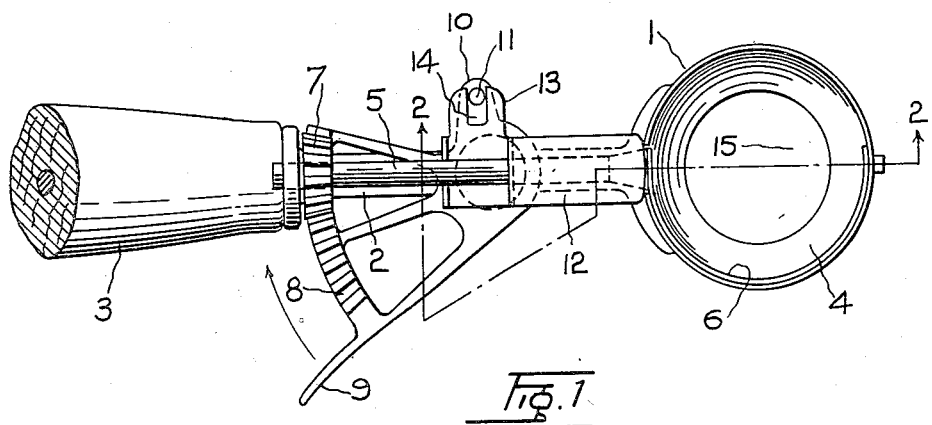
Fig. 1 is a plan view of the invention.
Figure 2:
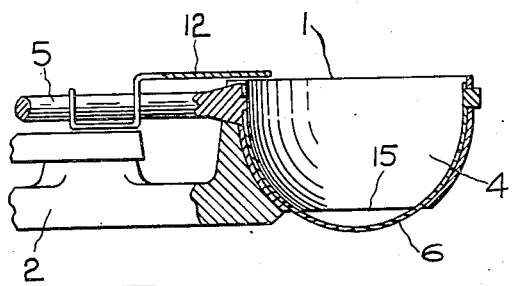
Fig. 2 is a sectional view taken on the line 2—2 of Figure 1.
Figure 3:
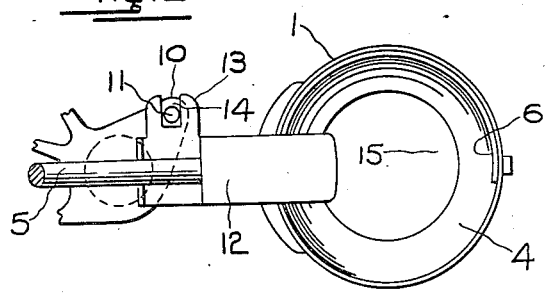
Fig. 3 is a part plan view showing the blade projecting across the receptacle.

The shank 2 provides a mounting for a rocking shaft 5 which terminates at one end inside the receptacle and is fitted with semi-circular wire or knife 6 lying in close proximity to the surface of the receptacle for the purpose of releasing the ice cream therefrom after filling. The shaft is fitted with a pinion 7 which is rocked by means of a toothed quadrant 8 having a thumb lever 9, the quadrant being provided with a suitable spring, not shown, for returning it to its normal position as indicated in Figure 1, when the pressure upon the lever 9 is removed. The device thus far described is generally similar to the scoop commonly used by ice cream vendors. A lug 10 is fitted upon the axis of the quadrant 8 and is provided with a crank pin 11, the purpose of which will hereinafter appear.

Slidably mounted upon the shaft 5 is a blade or other suitable projecting member 12 having a side lug 13 provided with a slot 14 which is engaged by the pin 11, so that as the quadrant 8 is swung about its axis through pressure applied to the lever 9, the blade is pushed forwardly across the top of the receptacle. The receptacle 4 is provided with an opening 15 of appreciable size, which is preferably concentric to the vertical axis of said receptacle.

In operation, the receptacle of the scoop is filled in the ordinary way by drawing it into the ice cream and, if desired, subsequently drawing it in contact with the side walls of the ice cream container to level off the quantity picked up. During the filling process a quantity of material passes through the opening 15 in the receptacle 4 leaving its converging side walls only to resist the entry of ice cream thereto, thus reducing compression to a material extent and leaving the ice cream in the receptacle of substantially the same bulk and density as that in the container from which it was taken. As the thumb lever 9 is depressed, the movement of the knife 6 across the inner surfaces of the receptacle breaks the adhesion of the ice cream from its surface and cuts off that portion which has extruded through the opening 15, the simultaneous movement of the blade 12 to project across the rim of the receptacle prevents the ice cream from being displaced.

When the scoop is inverted over a cone or other vessel and the thumb lever released, the blade 12 is withdrawn, to allow the ice cream to fall thereinto as the knife 6 returns across the receptacle surface to its normal position.

What I claim as my invention is:

1. A scoop for ice cream and the like having a semi-spherical receptacle and a handle, said receptacle having a relatively large wall opening through which a portion of the ice cream is adapted to extrude during the filling operation to prevent compacting the same, and unitary means within the receptacle for breaking the adhesion of the ice cream to its inner surface and for severing the extruding portion.

2. In a scoop for ice cream and the like having a semi-spherical receptacle and a handle, said receptacle having a relatively large wall opening through which ice cream would extrude during the normal process of filling the receptacle to prevent compacting the same, means for removing the extruded portion of ice cream, and means for retaining the ice cream within the receptacle against displacement during the process of removing the extruded portion.

3. In a scoop for ice cream and the like having a semi-spherical receptacle and a handle, said receptacle having a relatively large wall opening through which the ice cream is adapted to extrude during the filling operation to prevent compacting the same, and a semi-rotary knife adapted for movement substantially in contact with the surface of the receptacle and across the opening for severing the extruded portion.

4. In a scoop for ice cream and the like having a semi-spherical receptacle and a handle, said receptacle having a relatively large wall opening through which the ice cream is adapted to extrude during the filling operation to prevent compacting the same, and a semi-rotary knife adapted for movement substantially in contact with the surface of the receptacle and across the opening, said knife being normally disposed in a position adjacent the rim of the bowl and remote from the opening.

5. In a scoop for ice cream and the like having a semi-spherical receptacle and a handle, said receptacle having a relatively large wall opening through which the ice cream is adapted to extrude during the filling operation to prevent compacting the same, a semi-rotatable knife adapted for movement substantially in contact with the inner surface of the receptacle and across the opening for breaking the adhesion of the ice cream to the receptacle and to sever the extruding portion, a reciprocal lever for operating the knife, a blade also operable by said lever adapted to overlie the receptacle when the lever is moved in one direction to the end of its stroke and to be retracted from said overlying position as the lever is moved to the end of its reverse stroke.

6. A scoop for ice cream and the like comprising a semi-spherical receptacle having a relatively large wall opening normally uncovered during the filling of the receptacle with ice cream to permit extrusion of a portion of the ice cream to prevent compacting of the same, and means cooperating with the opening and movable across the same for severing the extruded portion.

7. In an ice cream disher the combination of a bowl having an open top, a scraper normally positioned in the bowl and mounted to sweep across and to separate the ice cream from the inner face of the bowl, the bowl being provided with an opening of sufficient area to permit the ice cream to extrude therethrough and prevent packing of the ice cream in the bowl when it is scooped from a mass, and means for moving the scraper in the bowl and across the opening to sever the extruded portion from the ice cream in the bowl.

FRANK REGINALD CHESTER.